US008644667B2

(12) United States Patent
Katayama et al.

(10) Patent No.: US 8,644,667 B2
(45) Date of Patent: Feb. 4, 2014

(54) BACKPLANE STRUCTURE ALLOWING SETTING OF EQUAL PEER-TO-PEER COMMUNICATION DISTANCE BETWEEN TWO BLADES ARBITRARILY INSERTED INTO A PLURALITY OF FIXEDLY ARRANGED SLOTS

(75) Inventors: Yasunao Katayama, Kanagawa (JP); Seiji Munetoh, Kanagawa (JP); Atsuya Okazaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/170,257

(22) Filed: Jun. 28, 2011

(65) Prior Publication Data

US 2012/0027354 A1    Feb. 2, 2012

(51) Int. Cl.
*G02B 6/00* (2006.01)
(52) U.S. Cl.
USPC ............ 385/135; 385/134; 385/136; 385/137
(58) Field of Classification Search
USPC .................................. 385/134, 135, 136, 137
See application file for complete search history.

(56) References Cited

U.S. PATENT DOCUMENTS

| 6,678,439 B2 | 1/2004 | Hoffman et al. | |
|---|---|---|---|
| 7,356,213 B1 * | 4/2008 | Cunningham et al. | 385/14 |
| 8,098,492 B2 * | 1/2012 | Rosenberg et al. | 361/736 |

FOREIGN PATENT DOCUMENTS

| JP | H10135911 A | 5/1998 |
|---|---|---|
| JP | 2000121865 A | 4/2000 |
| JP | 2005033683 A | 2/2005 |
| JP | 2005195873 A | 7/2005 |
| JP | 2006023749 A | 1/2006 |

OTHER PUBLICATIONS

"A High-Speed Optical Multi-drop Bus for Computer Interconnections," 16th IEEE Symposium on High Performance Interconnects. Applied Physics A: Material Science & Processing. Vol. 95, No. 4, pp. 1067-1072. Michael Tan et al., 2009.

* cited by examiner

*Primary Examiner* — Jennifer Doan
(74) *Attorney, Agent, or Firm* — Vazken Alexanian

(57) ABSTRACT

A backplane, a method for making a backplane, and optical communication apparatuses. The backplane includes: a plurality of optical elements each selected from the group consisting of: (i) optical fibers, (ii) optical waveguides, and (iii) a combination thereof, where the plurality of optical elements have the same length, where the plurality of optical elements form at least one bundle, where the elements are bundled at both ends of the at least one bundle such that end portion lengths of the plurality of optical elements differ from each other, thus forming a broadcast-star topology, and where the plurality of optical elements is connected such that communication distance between at least two blades that can be inserted into the back plane is constant.

17 Claims, 10 Drawing Sheets

PRIOR ART

PRIOR ART

PRIOR ART

PRIOR ART

BACKPLANE STRUCTURE ALLOWING SETTING OF EQUAL PEER-TO-PEER COMMUNICATION DISTANCE BETWEEN TWO BLADES ARBITRARILY INSERTED INTO A PLURALITY OF FIXEDLY ARRANGED SLOTS

CROSS-REFERENCE TO RELATED APPLICATION

This application claims priority under 35 U.S.C. §119 from Japanese Patent Application No. 2010-149373 filed Jun. 30, 2010, the entire contents of which are incorporated herein by reference.

BACKGROUND ART

1. Field of the Invention

The present invention relates to an optical interconnect, and specifically to maintaining a constant communication distance of optical interconnect in a backplane structure in which a plurality of blades can be inserted into a plurality of fixedly arranged slots.

2. Related Art

Even an optical communication function of a large-scale computer, which used to be divided into multiple kinds of units in the past, has become able to be contained in a single board at a high density, allowing the construction of a high-bandwidth communication apparatus through the installment of a plurality of such boards.

A single board has a shape like a thin blade and therefore can be simply referred to as a "blade", and when such a single board contains the function of a server, it can be referred to as a "blade sever".

FIGS. 1(a) and 1(b) show an example of the configuration of a high-bandwidth optical communication apparatus. In the configuration example of FIG. 1(a), six blade servers can be inserted 150. Furthermore, the configuration in FIG. 1 (a) consists of peripheral equipment 100, a DVD Rom 110, a backplane 120, USB Port 130, battery 140, and a blade chassis 160.

Since functions needed for optical communication between computers are modularized, it can be configured so that either only a specific blade entirely implements a specific function, or that a specific function is distributed over and implemented by a plurality of blades (6 blades at the maximum in this example 150).

In order to accommodate a plurality of blades as being inserted into a high-bandwidth optical communication apparatus, a structure called a "backplane," such as 120, is prepared and contained in a blade chassis, such as 160. The blade chassis can also be called as a "base chassis", "enclosure", or "blade center," etc.

FIG. 1(b) shows a manner in which a blade server is inserted into a high-bandwidth optical communication apparatus. FIG. 1(b) includes an example of a blade (server) 170.

FIGS. 2(a) and 2(b) show an example of the configuration of a backplane 120. FIG. 2(a) is a schematic view to illustrate an internal structure that is made up within a blade chassis. In addition to the backplane 120, the figure consists of slots 200, a ventilation hole 220, and a component 230.

A plurality of slots is fixedly arranged in the backplane 200 and 210. The fixed arrangement of the plurality of slots are not necessarily limited to a single row, but can be arranged over in two or more rows 200 and 210. A blade is selectively inserted into any of the plurality of slots through a connector prepared on the blade side.

In the above described structure, cables (optical fibers in the case of optical communication) for connecting each blade to other blades, and moreover cables for connecting each blade to peripheral equipment are integrated in the backplane to form an optical interconnect. Thus, simply inserting a blade allows the connection with other blades, to networks, and peripheral equipment 100. Such an integrated structure allows the wiring of the rear face of a high-bandwidth optical communication apparatus to be put together, thereby providing a flexible structure that allows easy replacement of a server at the time of extension or failure thereof.

Further, such a flexible structure allows the capacity for the optical communication apparatus to be expanded by increasing the number of the blades depending on the budget and scale, or allows for the capacity to be reduced by leaving a vacant slot from which a blade is drawn out as it is. Usually, the capacity is set according to a peak performance, and a minimum necessary number of blades are installed. This is also an advantageous structure for cutting down ineffective electric cost needed for keeping useless blades in standby, as well as in the viewpoint of hardware conservation, such as maintenance cost.

If there is a margin in the area of the backplane and the strength of the backplane itself can be secured, there can be a case that a ventilation hole 220 is provided to secure airflow from the front face through to the rear face. But indeed, as the larger the size of the hole to be provided, the more attention should be paid to the rigidity of the backplane 120 itself, especially when the thickness of the substrate thereof is small.

FIG. 2(b) is a circuit diagram showing the relationship in which blades 1 to 6 are connected to each module within the blade chassis. Some of the modules are provided as being inserted as blades, and some are implemented as components in the areas other than the locations of the slots prepared on the backplane, such as area 230.

FIG. 3 is a rear view of a high-bandwidth optical communication apparatus. While FIGS. 1(a) and 1(b) are views from the front side, this figure shows the opposite side.

FIG. 3 consists of a power module 300, a management module 310, a switch module bay 320, a blower 330, and a serial module bay 340.

As shown in FIG. 3, a power module 300 and a blower 330, which is a cooling fan, can be provided utilizing, not the side where the blades are inserted, but the rear face (the side where slots do not protrude) of the backplane, that is, the rear face side of the blade chassis. Thus, an apparatus which can be shared by blades 1 to 6 can be shared wherever possible. In addition, various bays are prepared as well.

Nevertheless, as long as blades are expected to be selectively inserted into any slots, such as when three of the plurality of blades is to be inserted into any slots, three different combinations of communication distance can take place. This is true even for the combination of optical interconnects between two of those blades.

If there is a difference between the communication distance (peer-to-peer communication distance) of a blade-to-blade, physical optical interconnect, between two blades, which are one combination among the blades being inserted, and the peer-to-peer communication distance between two blades, which are another combination among the blades being inserted, then the scheduling control becomes complicated depending on the communication scheme. In this viewpoint, there is still room for improvement in the management of the wiring of cables.

FIG. 4(a) shows the configuration of the optical cables in U.S. Pat. No. 6,678,439 B2, and FIG. 4 (b) shows (what seems to be) an explanatory diagram of the fiber optical cable of that patent. U.S. Pat. No. 6,678,439 B2 provides a "Wavelength Division Multiplexing and Broadcast Optical Interconnection Apparatus."

As shown in FIG. 4(a), a WDM (wavelength division multiplexing) plate 1 is prepared for each of a WDM assembly 20 and a WDM assembly 30 by a communication scheme using WDM. Since the communication from a laser transmitter 11 and a detector diode receiver 12 comes together radially toward a fiber optic cable 13, it is (seems to be) set that the communication distances become substantially equal to each other.

Nevertheless, the structure in U.S. Pat. No. 6,678,439 B2, in which communication distances are equalized, merely results from a geometric property that any communication distance becomes equal in length as long as it lies along a plurality of diameters that radially extend from the center (there is a transmitter exit aperture 4 at the center) of a disc circle.

Moreover, the structure of the WDM plate 1 is merely a structure that three-dimensionally receives light from eight radial directions. It is not expected to receive a blade server, nor to arrange the slots radially (three-dimensionally) and fixedly. It can be for that reason that the WDM plate is not named as a backplate or backplane.

As stated above, FIG. 4(b) is an explanatory diagram of the simplified configuration of the fiber optic cable of U.S. Pat. No. 6,678,439 B2. In an attempt to make a simplified explanation, U.S. Pat. No. 6,678,439 B2 (seems to) describe the configuration of a bundle of fiber optic cable for a, seemingly, broadcast-star topology with constant latency that can be expressed by the following:

$$Li + M + N_i = \text{Const}(i=0, 1, \ldots, n),$$

where, L=Const (i=0, 1, ..., n), and
where, N=Const (i=0, 1, ..., n).

The fiber optic cable 13 seems to establish a link as a bundle between the WDM assembly 20 and the WDM assembly 30. Nevertheless, a plurality of fibers which are branched from the both ends of the bundle of the fiber optic cable forming the broadcast-star topology are merely configured to have a constant length from the branching point as with each other.

It is noted that the broadcast-star topology, which is a widely used topology at the present time, refers to a physical layout of network in which nodes are collectively connected to a central repeater.

Further, "A High-Speed Optical Multi-drop Bus for Computer Interconnections," 16th IEEE Symposium on High Performance Interconnects, Applied Physics A: Material Science & Processing, Volume 95, Number 4, pp. 1067-1072, Michael Tan et al. shows a communication scheme based on an optical multi-drop bus, which can be applied to the configuration of the present invention. That is an example of scheduling control, showing that significant expansion of memory can be achieved by exploiting a plurality of modules connected to a bus through a backplane as a commonly-used technology referred to as optical multi-drop coupling.

As a general technical explanation, a broadcast-star topology made up of hubs and repeaters is logically similar to a bus, and attention needs to be paid to the occurrence of collisions.

SUMMARY OF THE INVENTION

One aspect of the present invention is a backplane into which at least three blades can be inserted. The backplane includes: a plurality of optical elements each selected from the group consisting of: (i) optical fibers, (ii) optical waveguides, and (iii) a combination thereof, where the plurality of optical elements have the same length, where the plurality of optical elements form at least one bundle, where the elements are bundled at both ends of the at least one bundle such that end portion lengths of the plurality of optical elements differ from each other, thus forming a broadcast-star topology, and where the plurality of optical elements is connected such that communication distance between at least two blades that can be inserted into the back plane is constant.

Another aspect of the present invention is an optical communication apparatus, in which at least three blades can be inserted. The optical communication apparatus includes: a plurality of optical elements each selected from the group consisting of: (i) optical fibers, (ii) optical waveguides, and (iii) a combination thereof, where the plurality of optical elements each has a same length, where the plurality of optical elements form at least one bundle, where the plurality of optical elements are bundled at both ends of the at least one bundle such that end portion lengths of the optical elements differ from each other, forming a broadcast-star topology, and where the plurality of optical elements are connected such that a communication distance between at least two blades that can be inserted into the backplane is constant.

Yet another aspect of the present invention is another optical communication apparatus. The optical communication apparatus includes: at least two blades, a blade chassis with at least two slots suitable for receiving the blades, and a plurality of optical elements of equal length configured to form at least one broadcast-star topology configuration with varying end lengths, where the plurality of optical elements connect the at least two blades such that communication distance between the at least two blades is constant.

Yet another aspect of the present invention is a method for manufacturing a backplane into which three or more blades can be inserted. The method includes the steps of: forming a broadcast-star topology from a plurality of optical elements each selected from the group consisting of: (i) optical fibers, (ii) optical waveguides, and (iii) a combination thereof, where each optical element of the plurality has a same length, where the plurality forms at least one bundle, and where the optical elements forming the broad-cast topology are bundled at both ends of the at least one bundle such that end portion lengths of the optical elements differ from each other, adding a slot for inserting at least one blade at a location of connection where communication distance between two blades that can be inserted is constant, and connecting the added slot with end portions of the optical elements.

DETAILED DESCRIPTION OF THE DRAWINGS

Figure 1A:
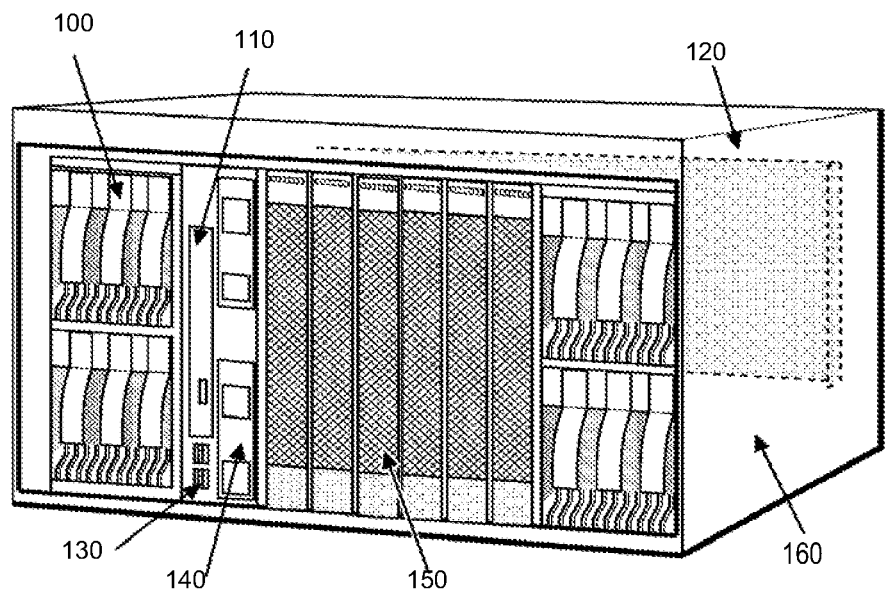
FIG. 1(a) shows an example of the configuration of a high-bandwidth optical communication apparatus.
Figure 1B:
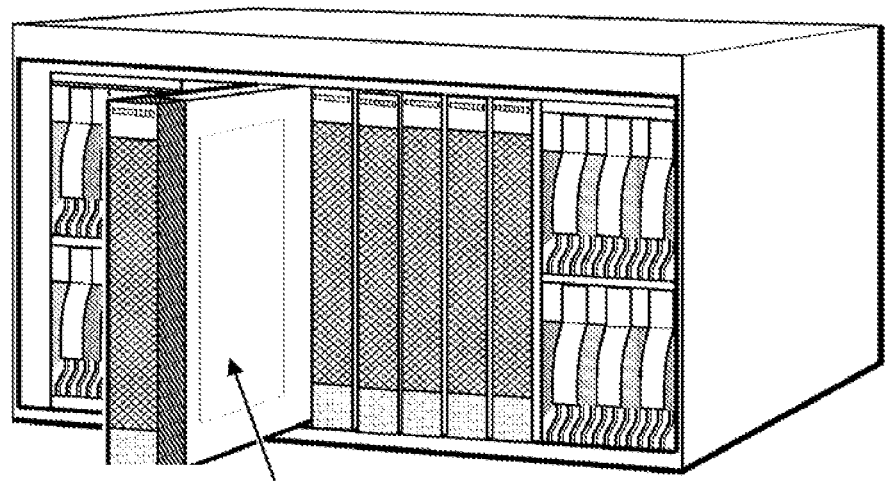
FIG. 1(b) shows an example of the configuration of a high-bandwidth optical communication apparatus.
Figure 2A:
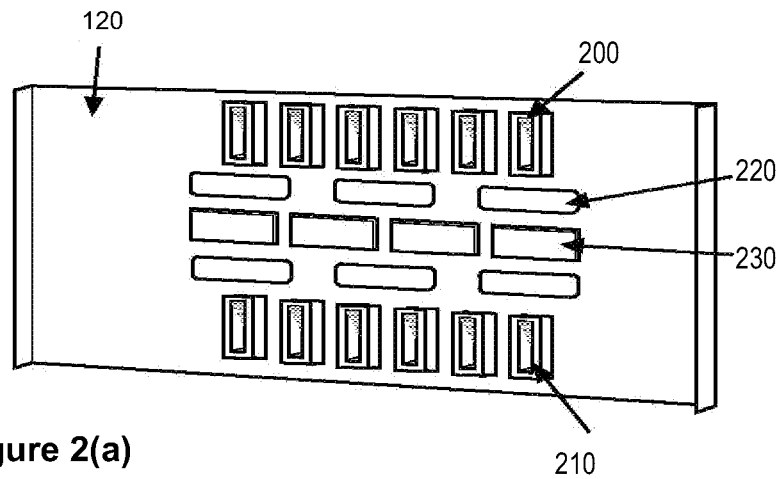
FIG. 2(a) shows an example of a configuration of a backplane.
Figure 2B:
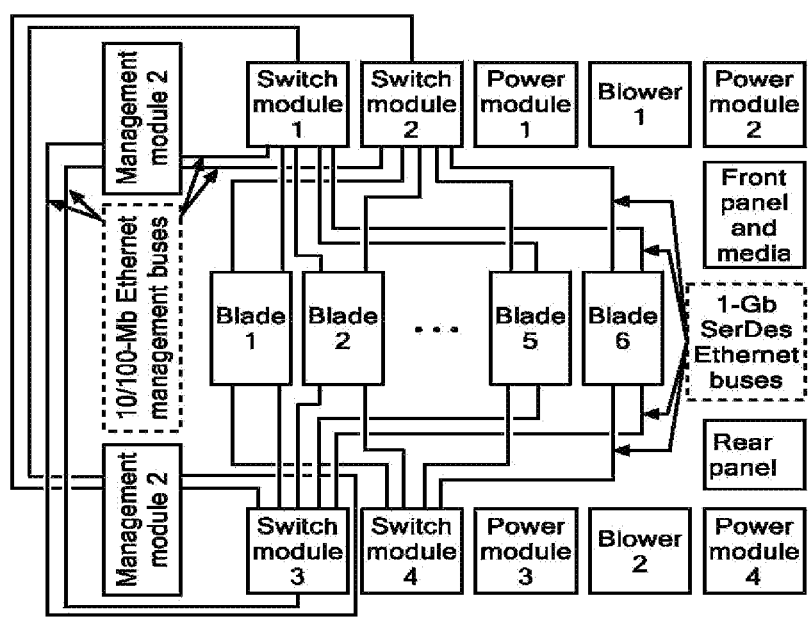
FIG. 2(b) shows a circuit diagram showing the relationship in which blades are connected to each module in a blade chassis of the backplane in FIG. 2(a).
Figure 3:
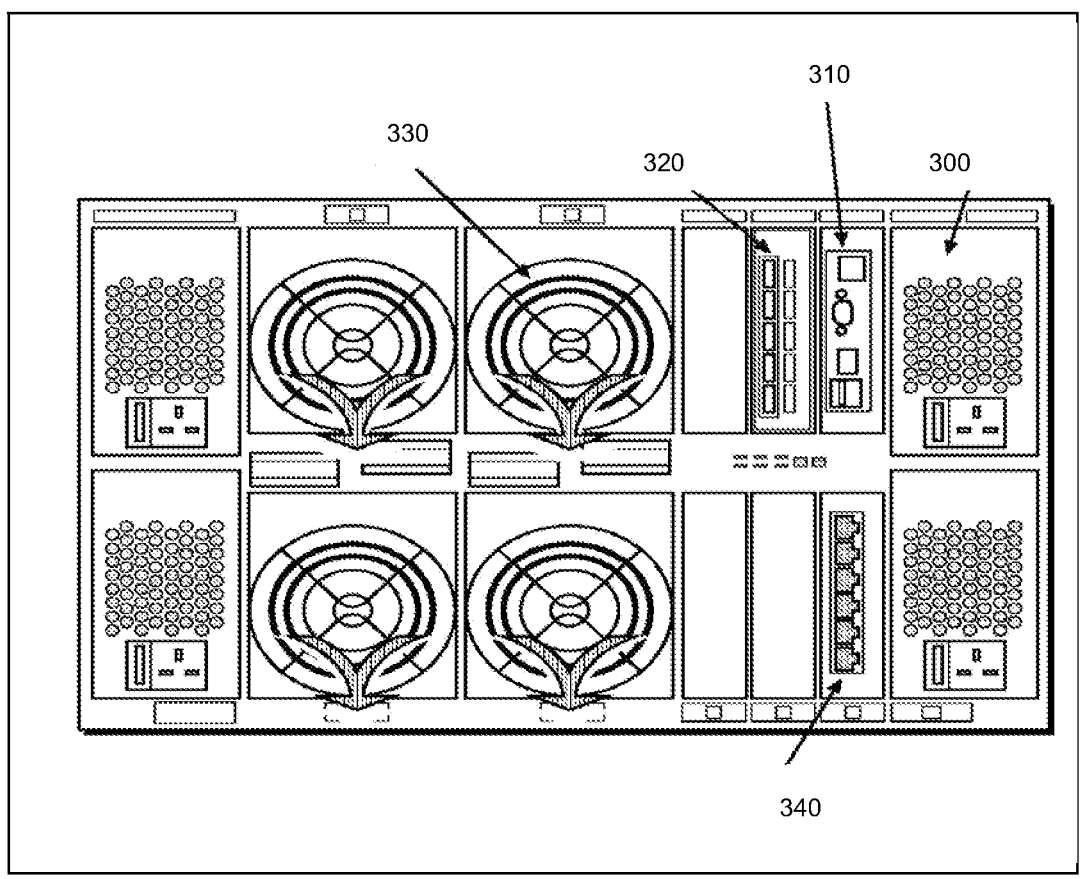
FIG. 3 is a rear view of a high-bandwidth optical communication apparatus.
Figure 4A:
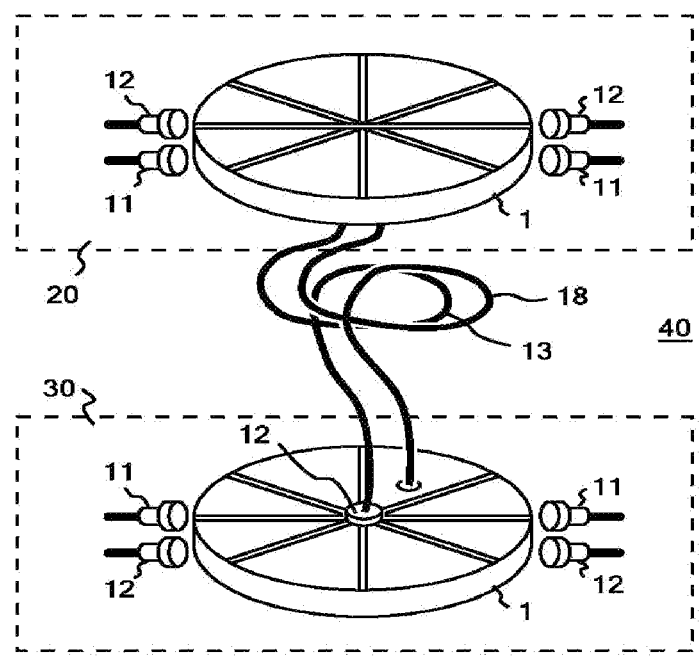
FIG. 4(a) shows the configuration of an optical cable.
Figure 4B:
FIG. 4(b) shows an explanatory diagram of the simplified configuration of the optical cable in FIG. 4(a).
Figure 4B:
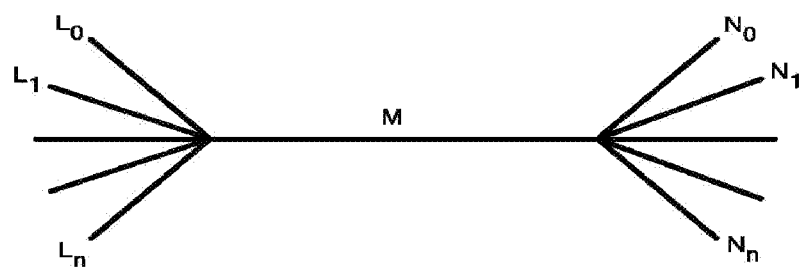
Figure 5A:
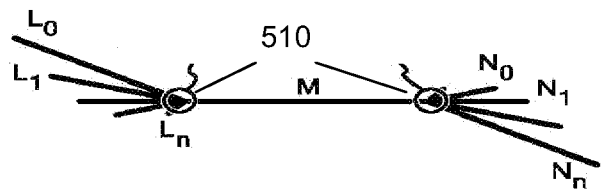
FIG. 5(a) illustrates a bundle of broadcast-star topology of optical fiber or optical waveguide in a backplane according to an embodiment of the present invention.
Figure 5B:
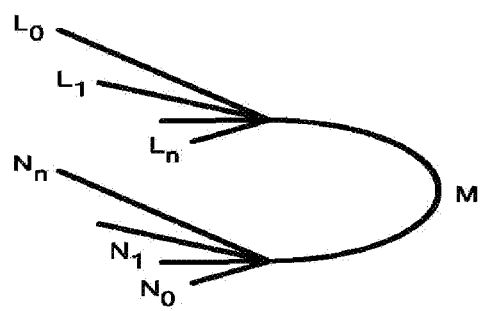
FIG. 5(b) illustrates a bundle of a deformed broadcast-star topology of optical fiber or optical waveguide in a backplane according to an embodiment of the present invention.
Figure 5C:
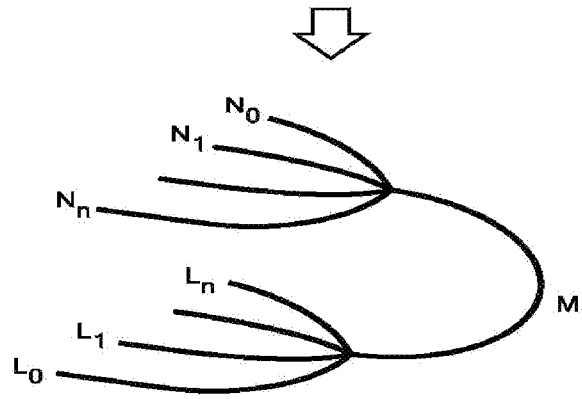
FIG. 5(c) illustrates a bundle of a deformed broadcast-star topology of optical fiber or optical waveguide in a backplane according to an embodiment of the present invention.

FIGS. 5(a), 5(b) and 5(c) illustrate bundles of broadcast-star topology of optical fiber (or optical waveguide), which is utilized to make up the backplane of the present invention.

As shown in FIG. 5(a), a plurality (n in this example) of optical fibers each of which has the same length (L+M+N=Const) are provided and the plurality of (n in this example) optical fibers form at least one bundle. The broadcast-star topology with constant latency of FIG. 5(a) can be expressed, formally, as follows: $L_i+M+N_i$=Const(i=0, 1, ..., n).

As shown in FIG. 5(a), the plurality of optical fibers are bundled at both ends of one bundle such that the lengths of the optical fibers from end portions thereof differ from each other, thus forming a broadcast-star topology.
Where, L0 L1≠ ... ≠Ln (distances are different from each other);
where, M is common for all the optical fibers (distances are equal to each other); and
where, N0≠N1≠ ... Nn (distances are different from each other).

It is considered that the name of the broadcast-star topology originated from the fact that a plurality of optical fibers are branched off from a bundled portion to spread in a star form. Utilizing it in such a way to cause certain unidirectional light to be branched off into plural rays of light will function as a coupler for splitting, or a splitter 510. Utilizing it for coupling and collecting plural rays of light to form one unidirectional light will function as a coupler for combining, or a combiner 510.

Utilizing the bundle of broadcast-star topology of the optical fiber (or optical waveguide), the backplane can be further applied to such connections as that the peer-to-peer communication distance between two blades to be arbitrarily inserted in a backplane becomes constant.

Using an equation, the condition that the communication distance of a physical optical interconnect between two blades (peer-to-peer communication distance) is made constant can be represented by the fulfillment of the following relationship (as shown in FIG. 5(a)):

$$Li+M+Ni=\text{Const}(i=0, 1, \ldots, n)$$

Further, the bundle of broadcast-star topology illustrated in FIG. 5(a) can be illustrated as being deformed as shown in FIG. 5(b), and further as being deformed as shown in FIG. 5(c).

Figure 6:
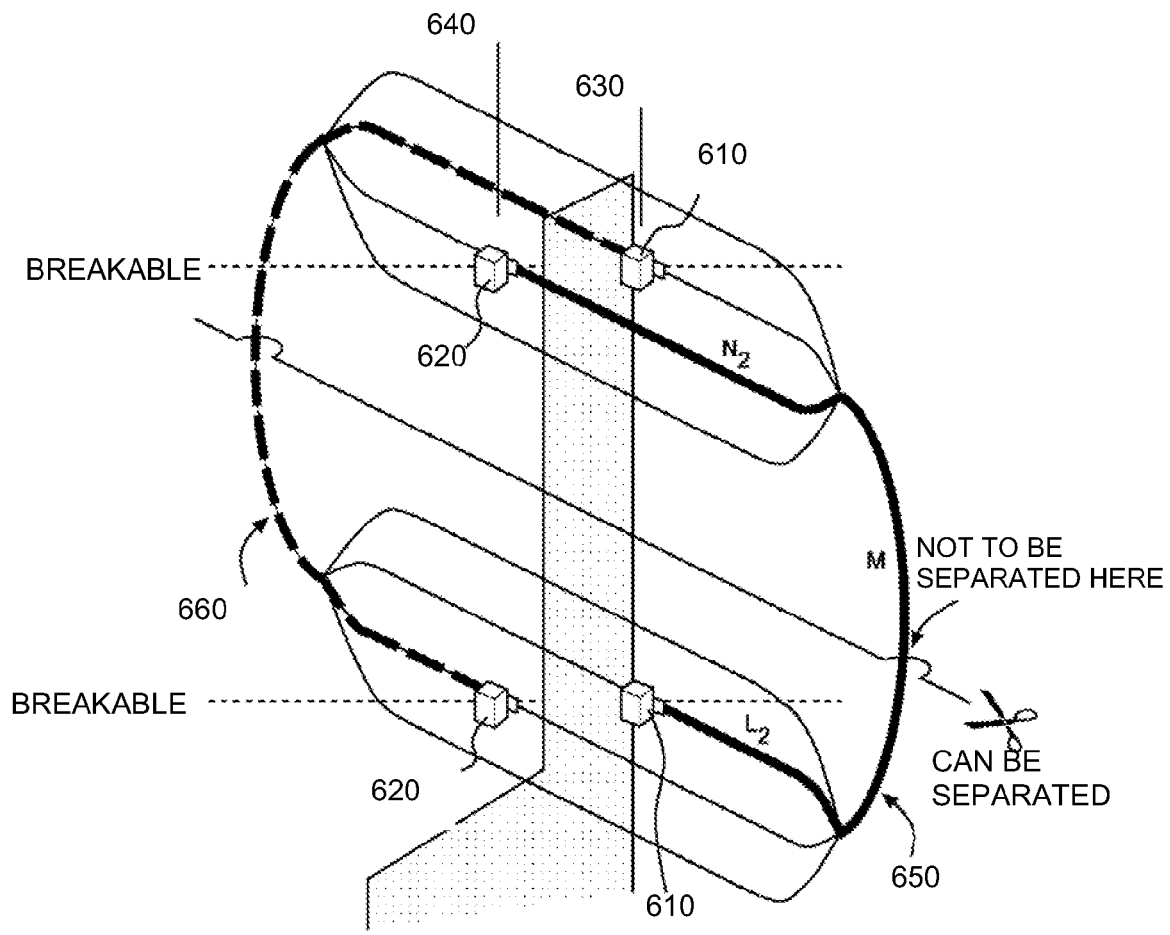
FIG. 6 is a schematic diagram showing a first embodiment of the backplane of the present invention.

FIG. 6 is a schematic diagram to show a first embodiment of the backplane of the present invention. In the configuration of the backplane, a connector for both input/output referred to as 610 is prepared as optical connector 2 (OUT, IN), and another connector for both input/output referred to as 610 is prepared, at the location of the slot into which the blade 2 630 is inserted. On the other hand, at the location of the slot into which the blade 3 640 is inserted, a connector for both input/output referred to as an optical connector 3 (OUT, IN) 630 is prepared, and one more connector for both input/output referred to as an optical connector 3 (OUT, IN) 630 is prepared.

The broadcast-star topology of optical cable or optical waveguide, which is illustrated as being deformed, as shown in FIG. 5(c), is aligned for the blade 1, the blade 2, ... the blade 4 diagonally crossing these (rows of) blades. This indicates that an optical fiber or optical waveguide to be connected to a certain blade is set differently from an optical fiber or optical waveguide to be connected to another blade.

When the blade 2 630 and the blade 3 640 perform peer-to-peer communication, a signal outputted from the 620 (OUT) of the blade 3 640 is inputted into the 610 (IN) of the blade 2 630. This is a primary path 650 as the optical interconnect. From the bundle of the broadcast-star topology, a communication distance utilizing an optical fiber or optical waveguide of N2→M→L2 indicated by a thick solid line is set.

In a similar manner, the optical fiber or optical waveguide to be connected to the blade 4 can be set differently from the optical fiber or optical waveguide to be connected to the blade 2 630 or the blade 3 640. Actually, in the case of optical fiber, although utilizing the bundle of the broadcast-star topology of FIG. 5(a) is sufficient and there is no need of aligning it diagonally crossing the row of blades, if an optical waveguide is utilized, when it is disposed on the flat plane of the backplane, a plurality of them can be arranged in regular (typically in parallel), orderly and even accurate manner. This is quite advantageous when giving consideration to lamination process of core and clad by means of resin.

Further, even though slots at the locations of connection need to be added, the locations for positioning them are orderly. The added slot and the end of optical waveguide are connected for optical interconnect.

In this example, for the sake of simplicity, description is made assuming that there are four optical fibers or optical waveguides; however, when the number of blades is six, it can be arranged that the number of optical fibers or optical waveguides to form a bundle of broadcast-star topology is six.

Further, when the blade 2 630 and the blade 3 640 perform peer-to-peer communication, a signal outputted from the 620 (OUT) of the blade 3 640 is inputted into the 610 (IN) of the blade 2 630. The communication path indicated by a thick broken line can provide a secondary path 660 as an optical interconnect. That is, if another bundle of the same broadcast-star topology is prepared, it can be utilized to set, besides the primary path 650 (indicated by a thick solid line), a secondary path 660 (indicated by a thick broken line) as a redundant communication path that has the same communication distance as that of the primary path 650, for the communication between the blade 2 630 and the blade 3 640.

In peer-to-peer communication between two blades, since ensuring the reliability of communication is important, even if any failure occurs midway of one communication path, another communication path, which is redundantly set, can function.

The bundle of broadcast-star topology of optical fiber or optical waveguide used as the primary path 650 is different from that used as the secondary path 660. It is noted, however, that, as readily seen from the figure, although each bundle of broadcast-star topology is interrupted at the location of an optical connector, an optical fiber or optical waveguide can be provided in an extension from the interrupted location, thereby allowing effective use of the limited area of the backplane.

Moreover, the configuration that allows the concurrent formation of a redundant communication path as another bundle of broadcast-star topology by a process of laminating a core and cladding with resin, etc. is quite advantageous in production.

Moreover, taking advantage of the interruption at the location of an optical connector, if the optical waveguide is formed in a flat plane, the entire flat plane can be folded with the row linking the locations of optical connectors on the flat plane being as a folding line. For the aspect of configuring the 610 and the 620 (OUT, IN) to be for both input/output, there will be various conceivable alternatives. In an optical connector for both input/output which is referred to as the 610, it is configured that an optical connector for output which is referred to as 610 (OUT) and an optical connector for input which is referred to 610 (IN) can function.

Further, although it is conditional that a part M of the configuration of the bundle will not be broken, the flat plane can be separated at both ends of the bundle of broadcast-star topology of optical waveguide, but this will be described later.

Figure 7:
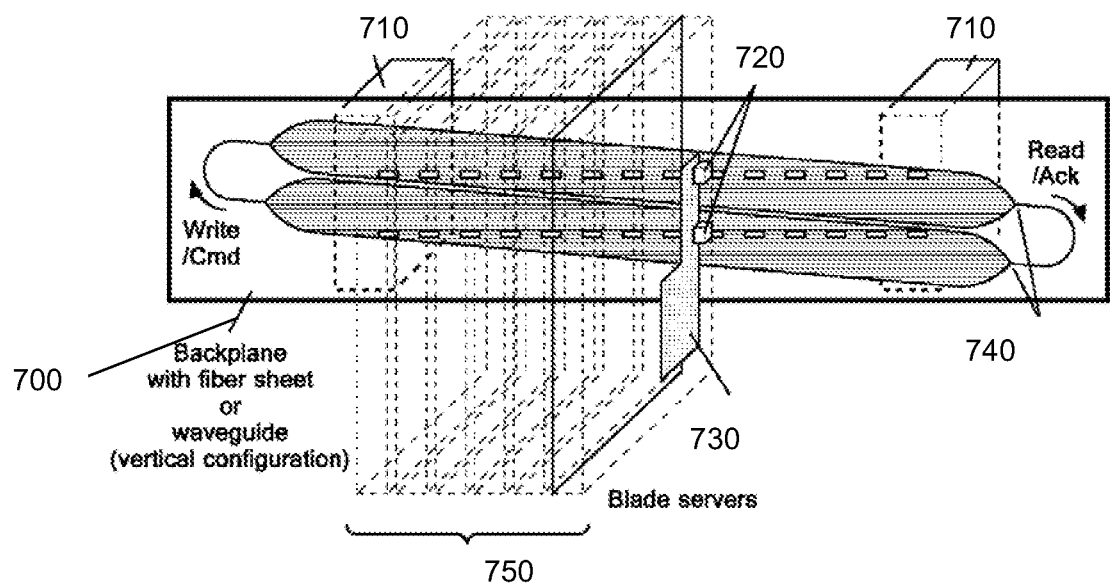
FIG. 7 is a general view showing an embodiment of the backplane of the present invention.

FIG. 7 is a general view showing the first embodiment of the backplane of the present invention. FIG. 7 includes a backplane 700, I/O modules 710, optical connectors 720, an optical expansion card 730, a coupler for splitting and combining 740, and blade servers, (in this particular embodiment, six) 750. One can see the state in which a bundle of optical fiber or optical waveguide is formed in a backplane; and the general positional relationship with blade servers to be inserted.

An optical connector 710 is provided in an optical expansion card 720 that is provided in a blade server 750.

Figure 8A:
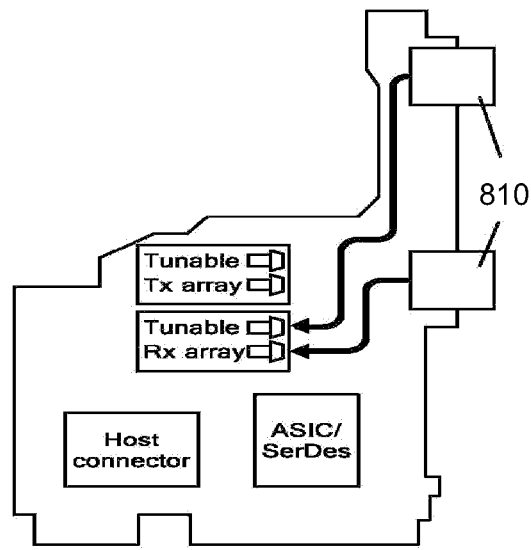
FIG. 8(a) shows an example of a configuration of an optical expansion card for multiple wavelengths.
Figure 8B:
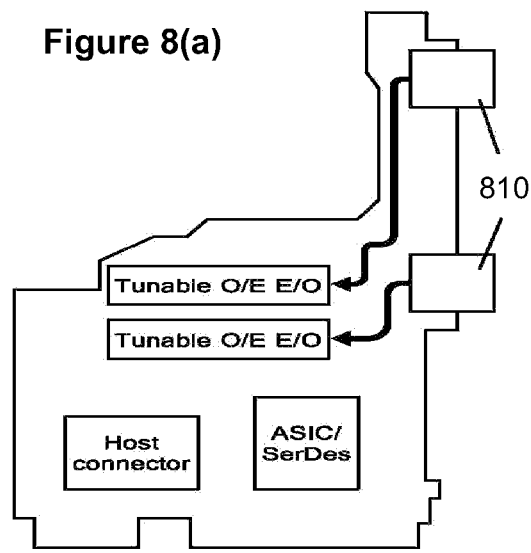
FIG. 8(b) shows an example of a configuration of an optical expansion card for a single wavelength.

FIGS. 8(*a*) and 8(*b*) show examples of the configurations of optical expansion cards. An optical expansion card for multiple wavelengths (Multi-λ) of FIG. 8(*a*) and an optical expansion card for single wavelength (Single-λ) of FIG. 8(*b*) can be used.

FIG. 8(*a*) can be for high bandwidth and employ, for example, a 10 Gbps X10λ: memory expansion; 40/100 GbE SMP CPU expansion.

FIG. 8(*b*) can employ, for example, a 10 GbE, IB, FC.

Both figures employ an optical connector 810 to a backplane, e.g. optical backplane. The difference between them is that when a blade with a large amount of data communication is used, the optical expansion card of multiple wavelengths is used, and when a blade with a relatively low amount of communication is used, the optical expansion card of single wavelength is used.

Figure 9:
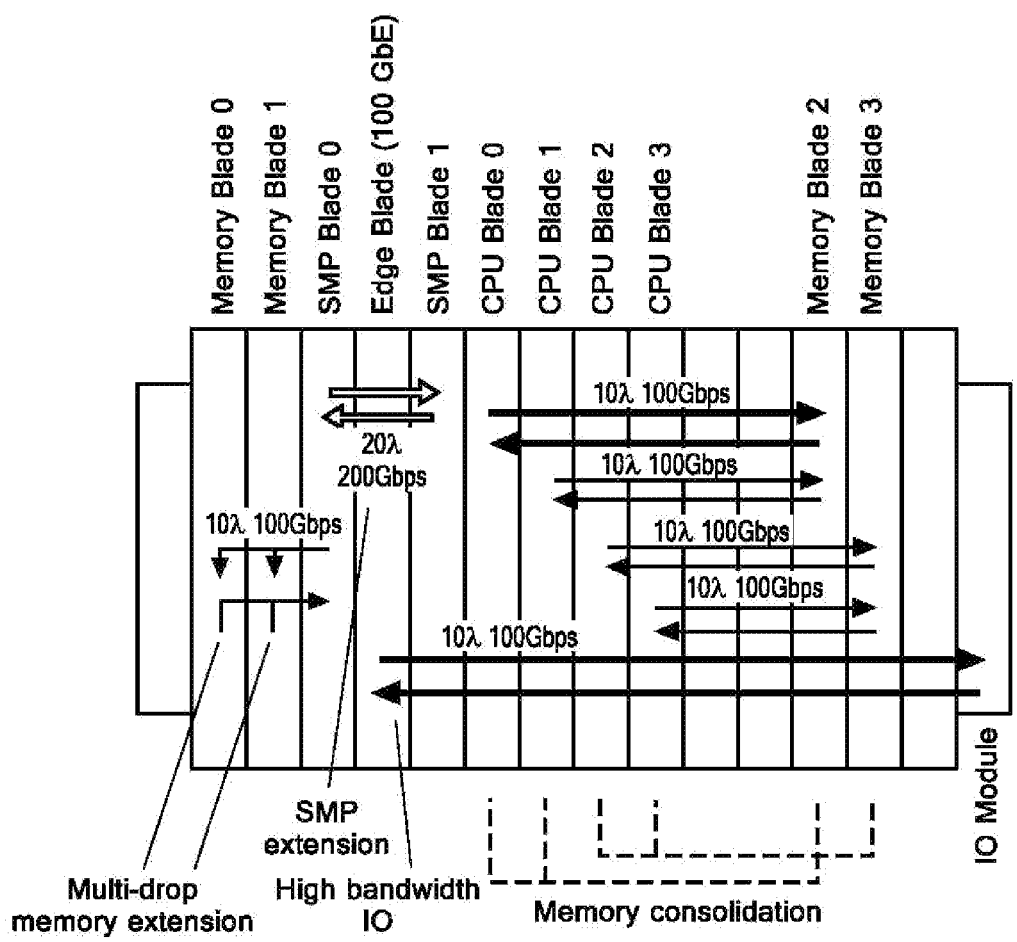
FIG. 9 illustrates an example of communication between blades, and a wavelength $\lambda$ and bandwidth to be used in the communication between the blades.

FIG. 9 illustrates example communication between blades, and the wavelength λ and bandwidth to be used in the communication. According to this figure, it is seen that using a different wavelength for each blade allows virtual configuration of a plurality of peer-to-peer paths or multi-drop paths of different bands by one optical backplane of broadcast-star topology.

Figure 10:
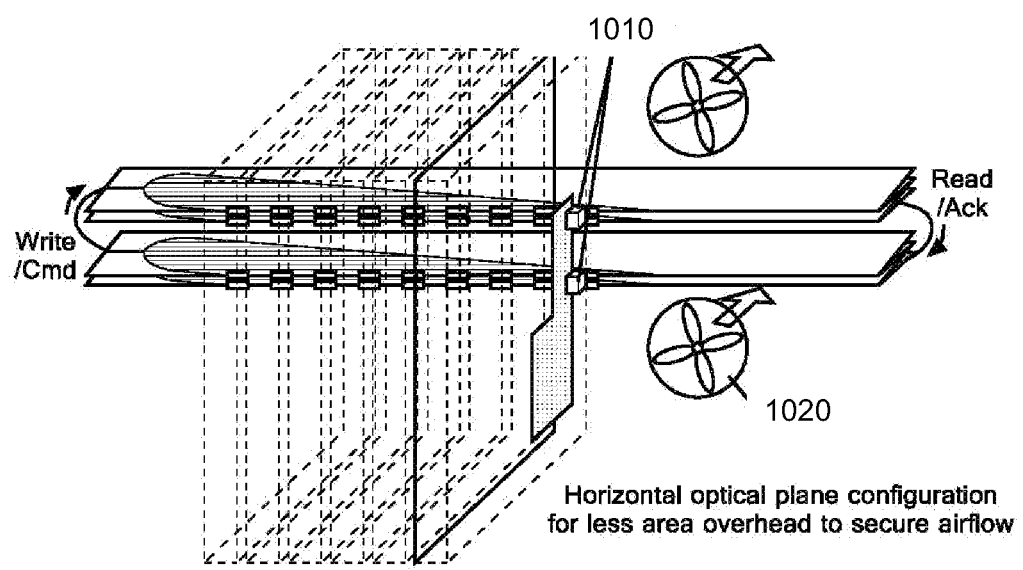
FIG. 10 is a general view showing another embodiment of the backplane of the present invention.

FIG. 10 is a general view showing a second embodiment of the backplane of the present invention.

As described in FIG. 6, taking advantage of the interruption at the location of an optical connector, if an optical waveguide is formed in a flat plane, the entire flat plane can be folded with the row linking the locations of optical connectors 610 and 620, (optical connectors in FIG. 10 are shown by 1010), on the flat plane being as a folding line. Further, although it is conditional that a part M of the configuration of a bundle will not be broken, the flat plane can also be separated at both ends of the bundle of broadcast-star topology of optical waveguide.

This results in that a plurality of optical waveguides forming two bundles are separated at connection locations with a plurality of blades to be inserted, and are respectively set to be in (3-dimensionally) different flat planes.

Setting folded and separated flat planes, on which optical waveguides are formed, to be a horizontal optical plane configuration allows effective creation of airflow utilizing a cooling fan or a blower 1020. Since airflow that passes in the direction from the front face to which blades are inserted to the back face side of the blade chassis can be effectively utilized, it is possible to secure a ventilation space which allows an effective use of forced convection of a fan. This remains true even if many components are disposed at a high density on the backplane, even if a ventilation area cannot be secured, and even if bundles of optical fibers or optical waveguides are disposed on the back backplane at a high density thereby occupying the area.

Placing a plurality of folded flat planes on top of each other and fixing them to a blade chassis allows the strength of the flat planes against bending to be increased.

The expression of "communication distance is constant" or "peer-to-peer communication distance is constant" does not necessarily mean that the distance is strictly constant without changes. The concept of being workable and effective in a peer-to-peer communication should be interpreted in a broad sense without applying strict interpretations.

Further, although the description of the present invention has been made assuming a backplane structure, a person skilled in the art will be able to include any embodiment which is characterized by the use of a bundle of the broadcast-star topology, in a blade chassis, a high-bandwidth optical communication apparatus, and other equipment, even if it is not an independent component as a backplane.

What is claimed is:

1. A backplane into which at least three blades are inserted comprising:
   a plurality of optical elements each selected from the group consisting of: (i) optical fibers, (ii) optical waveguides, and (iii) a combination thereof, wherein said plurality of optical elements have the same length, wherein said plurality of optical elements form at least one bundle, wherein said elements are bundled at both ends of said at least one bundle such that end portion lengths of said plurality of optical elements differ from each other, thus forming a broadcast-star topology, and wherein said plurality of optical elements are connected such that communication distance between at least two blades that are inserted into said back plane is constant.

2. The backplane according to claim 1, wherein at least one of said at least one bundle is made of a plurality of optical waveguides, and wherein said plurality of optical waveguides are aligned in parallel with each other in a flat plane shape.

3. The backplane according to claim 1 further comprising: at least a primary and secondary path, wherein said secondary path is a redundant communication path with an equivalent distance to said primary communication path, and wherein at least one of said at least on bundle is connected as said secondary path.

4. The backplane according to claim 1 further comprising:
   a plurality of blades that are to be inserted into said backplane; and a plurality of optical waveguides that form two bundles, wherein said plurality of waveguides is connected to said plurality of blades that are to be inserted, wherein said plurality of blades that are to be inserted, and wherein each optical waveguide connected to a blade is set different from another optical waveguide connected to another blade.

5. The backplane according to claim 2 further comprising:
a plurality of blades that are to be inserted into said backplane; and
a plurality of optical waveguides that form two bundles, wherein said plurality of optical waveguides that form two bundles are connected to said plurality of blades to be inserted, wherein said plurality of optical waveguides that form two bundles are separated at a location of connection with said plurality of blades that are to be inserted, and wherein said plurality of optical waveguides that form two bundles are set to be in different planes, respectively.

6. The backplane according to claim 5 further comprising:
a plurality of flat planes, wherein said flat planes are separated and folded, and wherein said flat planes are placed on top of each other to be fixed on a blade chassis.

7. An optical communication apparatus, in which at least three blades are inserted, said optical communication apparatus comprising:
a plurality of optical elements each selected from the group consisting of: (i) optical fibers, (ii) optical waveguides, and (iii) a combination thereof, wherein said plurality of optical elements each has a same length, wherein said plurality of optical elements form at least one bundle, wherein said plurality of optical elements are bundled at both ends of said at least one bundle such that end portion lengths of said optical elements differ from each other, forming a broadcast-star topology, and wherein said plurality of optical elements are connected such that a communication distance between at least two blades that are inserted into a backplane is constant.

8. An optical communication apparatus comprising:
at least two blades;
a blade chassis with at least two slots suitable for receiving said at least two blades; and
a plurality of optical elements of equal length configured to form at least one broadcast-star topology configuration with varying end lengths, wherein said plurality of optical elements connect said at least two blades such that communication distance between said at least two blades is constant.

9. The apparatus according to claim 8, wherein said at least one broadcast-star topology configuration is deformed.

10. The apparatus according to claim 8, wherein said plurality of optical elements that form said at least one broadcast-star topology configuration are aligned diagonally across said at least two blades.

11. The apparatus according to claim 8, wherein said plurality of optical elements consists of optical waveguides and wherein said optical elements are aligned in parallel with each other in a flat plane along said blade chassis.

12. The apparatus according to claim 8 further comprising:
at least one optical expansion card, wherein said at least one optical expansion card contains at least one optical connector that connects said plurality of optical elements to at least one of said at least two blades.

13. The apparatus according to claim 8 further comprising:
at least a primary and secondary communication path between said at least two blades, wherein said primary connection path is formed by one connection path created from connecting said at least two blades using said plurality of optical elements, and said secondary communication path is created by another connection path created from connecting said at least two blades using said plurality of optical elements.

14. The apparatus according to claim 13, wherein said plurality of optical elements form a connection path at an interruption point by forming a connection that begins at said interruption point and ends at another connection point between said at least two blades, wherein said interruption point interrupts at least one of said at least one broadcast-star topology configuration formed by said plurality of optical elements by connecting said at least two blades.

15. The apparatus according to claim 14, wherein said optical elements consist of optical waveguides, wherein said plurality of optical elements are formed in a flat plane of said blade chassis, and wherein said flat plane is folded with a row linking locations of connection points on said flat plane being a folding line.

16. The apparatus according to claim 15, wherein said at least two blades communicate with different wavelengths, and said apparatus further comprises:
at least one optical expansion card, wherein said at least one optical expansion card contains at least one optical connector that connects said plurality of optical elements to at least one of said at least two blades, wherein said optical expansion card is of a type that accommodate blades with different wavelengths; and
an air flow unit on said blade chassis.

17. The apparatus according to claim 16, wherein said flat plane is separated at ends of at least one of said at least one broad-cast star topology formed by said plurality of optical elements to create a plurality of flat planes that are aligned on top of each other and fixed on said blade chassis.

* * * * *